(12) United States Patent
Anderson

(10) Patent No.: US 11,420,240 B1
(45) Date of Patent: Aug. 23, 2022

(54) PIPE CLEANING TOOL

(71) Applicant: Keith Anderson, Wheaton, IL (US)

(72) Inventor: Keith Anderson, Wheaton, IL (US)

(*) Notice: Subject to any disclaimer, the term of this patent is extended or adjusted under 35 U.S.C. 154(b) by 0 days.

(21) Appl. No.: 17/238,274

(22) Filed: Apr. 23, 2021

(51) Int. Cl.
 *B08B 9/04* (2006.01)
 *F16L 55/40* (2006.01)
 *F16L 55/30* (2006.01)
 *B08B 9/043* (2006.01)
 *F16L 101/12* (2006.01)

(52) U.S. Cl.
 CPC .............. *B08B 9/04* (2013.01); *B08B 9/0436* (2013.01); *F16L 55/30* (2013.01); *F16L 55/40* (2013.01); *B08B 2209/04* (2013.01); *F16L 2101/12* (2013.01)

(58) Field of Classification Search
 CPC ........ B08B 9/04; B08B 9/043; B08B 9/0436; B08B 9/0553; B08B 9/0557; B08B 2209/04; F41A 29/02; F16L 55/30; F16L 55/40; F16L 2101/12
 See application file for complete search history.

(56) References Cited

U.S. PATENT DOCUMENTS

| | | | | |
|---|---|---|---|---|
| 1,665,988 | A * | 4/1928 | Smith ..................... | F41A 29/02 15/104.165 |
| 2,601,691 | A * | 7/1952 | Dyer ....................... | F41A 29/02 42/95 |
| 4,144,609 | A * | 3/1979 | Dubs ....................... | F41A 29/02 15/181 |
| 4,716,673 | A * | 1/1988 | Williams ................ | F41A 29/02 228/115 |
| 7,644,463 | B1 * | 1/2010 | Crawford ................. | B08B 9/04 15/104.062 |
| 8,793,918 | B2 * | 8/2014 | Rogers .................... | F41A 29/02 42/95 |
| 2005/0028307 | A1 * | 2/2005 | Wu ......................... | B08B 9/045 15/104.33 |
| 2006/0236584 | A1 * | 10/2006 | Williams ................ | F41A 29/00 42/95 |
| 2014/0082989 | A1 * | 3/2014 | Canham .................. | F41A 29/02 15/247 |
| 2016/0138883 | A1 * | 5/2016 | Huffman ................. | F41A 29/02 15/88.4 |
| 2019/0107357 | A1 * | 4/2019 | McDonald ............... | B08B 9/00 |

* cited by examiner

*Primary Examiner* — Randall E Chin
(74) *Attorney, Agent, or Firm* — Justin Lampel

(57) ABSTRACT

A pipe and hose cleaning tool is provided. The pipe and hose cleaning tool is especially useful in cleaning industrial pipes and hoses used in pouring, for example, concrete at construction sites. The pipe and hose cleaning tool has a durable and somewhat rigid rope, a handle and a cleaning assembly.

14 Claims, 3 Drawing Sheets

PIPE CLEANING TOOL

BACKGROUND OF THE INVENTION

A pipe and hose cleaning tool is provided. The pipe and hose cleaning tool is especially useful in cleaning industrial pipes and hoses used in pouring, for example, concrete at construction sites. The pipe and hose cleaning tool has a durable and somewhat rigid rope, a handle and a cleaning assembly.

Devices for cleaning pipes are known. For example, U.S. Pat. No. 9,706,795 to Boring discloses a novel pipe cleaner. The novel pipe cleaner may include a housing component providing an elongated tube that detachably secures a brush component on one end and a pick component on an opposing end. The brush component and the pick component may include elongated portions for scraping and cleaning the residue from a smoke pipe. The elongated portions can be simultaneously and interchangeably stored within the lumen of the elongated tube so as to facilitate the mess-free storage and portability of the novel pipe cleaner.

Further, U.S. Pat. No. 10,507,569 to Marotta discloses a pipe-cleaning kit. The pipe-cleaning attachment is configured for use with a copper pipe. The pipe-cleaning attachment is a tool that cleans the interior surface and the exterior surface of the copper pipe in preparation for processing. By processing is meant one of several plumbing procedures including, but not limited to, soldering the copper pipe or cutting the copper pipe. The pipe-cleaning attachment is an electrically powered rotating brush that physically cleans the copper pipe. The pipe-cleaning attachment comprises a plurality of cleaning kits and a drive system. The plurality of cleaning kits comprises a collection of brushes. The drive system rotates a brush selected from the plurality of cleaning kits to clean the copper pipe.

Still further, U.S. Pat. No. 8,458,845 to Tabieros discloses a pipe cleaning device having a base; a plurality of bristles disposed on the base; and a connecting component disposed on the base, the connecting component is generally rectangular in cross section and has a first channel disposed therein, the connecting component is for engaging a standard attachment piece on a snake cable, the attachment piece being generally U-shaped with a first wing and a second wing each extending upwardly from a base platform, wherein a second channel is disposed in the first wing and a third channel is disposed in the second wing; wherein the connecting component can be inserted in between the first wing and the second wing such that the first channel is aligned with the second and third channel, wherein a screw can be threaded through the first, second, and third channel to secure the base to the snake cable.

However, these patents fail to describe a pipe and hose cleaning tool which is easy to use. Further, these patents fail to provide for a pipe and hose cleaning tool which allows the user to effectively clean an industrial pipe or hose from, for example, concrete.

SUMMARY OF THE INVENTION

A pipe and hose cleaning tool is provided. The pipe and hose cleaning tool is especially useful in cleaning industrial pipes and hoses used in pouring, for example, concrete at construction sites. The pipe and hose cleaning tool has a durable and somewhat rigid rope, a handle and a cleaning assembly.

An advantage of the present pipe and hose cleaning tool is that the present pipe and hose cleaning tool is easily portable.

Yet another advantage of the present pipe and hose cleaning tool is that the present pipe and hose cleaning tool is lightweight.

And another advantage of the present pipe and hose cleaning tool is that the present pipe and hose cleaning tool is durable.

For a more complete understanding of the above listed features and advantages of the pipe and hose cleaning tool reference should be made to the detailed description and the drawings. Further, additional features and advantages of the invention are described in, and will be apparent from, the detailed description of the preferred embodiments.

DETAILED DESCRIPTION OF THE PREFERRED EMBODIMENTS

A pipe and hose cleaning tool is provided. The pipe and hose cleaning tool is especially useful in cleaning industrial pipes and hoses used in pouring, for example, concrete at construction sites. The pipe and hose cleaning tool has a durable and somewhat rigid rope, a handle and a cleaning assembly.

Figure 1:
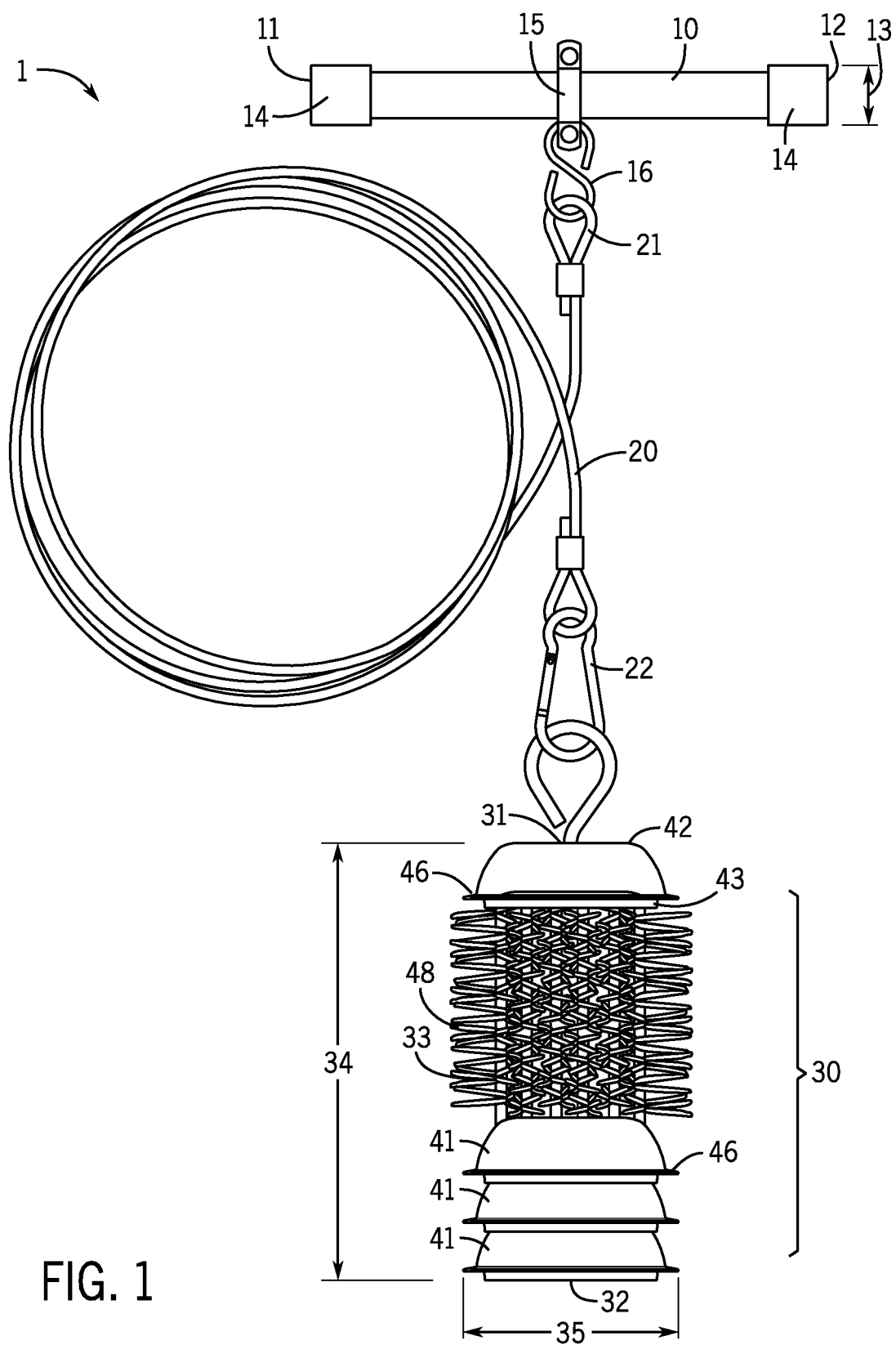
FIG. 1 illustrates a view of the entire pipe and hose cleaning instrument.

Referring first to FIG. 1, a pipe or hose cleaning tool 1 is provided. It should be understood that the device 1 may be used in connection with hoses, in addition to pipes. The pipe cleaning tool 1 may have a handle portion 10, a rope portion 20 and a cleaning assembly 30. The pipe cleaning tool 1 is suitable for cleaning pipes 50 (FIG. 2) which are used in, for example, construction sites wherein the pipes 50 can become clogged with material such as, for example, concrete. In an embodiment, the rope portion 20 may be a wire or may be coated with a material to make the rope portion 20 more stiff.

The handle portion 10 may have a first end 11, a second end 12 and a width 13. The width 13, in one embodiment, is preferably smaller than a diameter 51 of the pipe 50 to be cleaned by the tool 1. The terminal ends 11, 12 of the handle 10 may each have a protective cap 14. A securing mechanism 15 in the middle of the handle 10 may be used to secure the rope portion 20. The securing mechanism 15 may have a carabiner, clip, hook or other clip 16 that allows the rope portion 20 to be removed from the handle portion 10.

In an embodiment, the rope portion 20 may have a first end 21, a second end 22, a length 23. The first end 21 of the rope portion 20 may be removably secured to the carabiner, clip, hook or other clip 16 of the handle portion 10. The rope portion 20 may be rigid, yet flexible enough to bend for storage and transportation as shown in FIG. 1.

Figure 2:
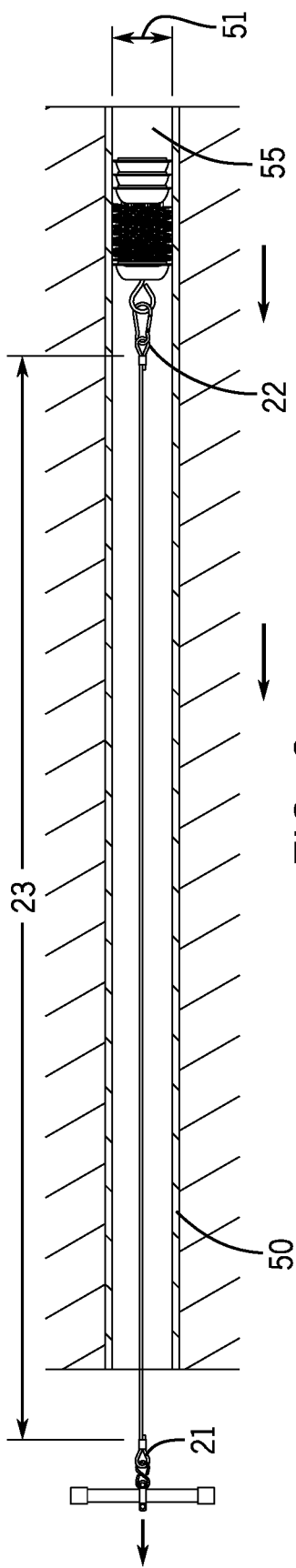
FIG. 2 illustrates the pipe and hose cleaning tool being used within the interior of a pipe or hose.

The rope portion 20 should be rigid enough so that when the rope portion 20 is placed in a straightened orientation (as shown in FIG. 2) the second end 22 of the rope portion 20 may move forward when the first end 21 of the rope portion 20 is pushed by a user.

The cleaning assembly 30 of the device may have a front 31, a back 32 and a generally cylindrical side 33. The cleaning assembly 30 may further have a length 34 and a width (or diameter) 35. In an embodiment, the elements of the cleaning assembly 30 may be interchanged with substitute elements having a larger or smaller width 35 (or diameter) so that the width 35 (or diameter) may be used with the proper corresponding diameter 51 of the pipe 50. Preferably, the width 35 of the bristles of the brush portion is at least slightly greater than the diameter 51 of the pipe 50 so that the bristles contact and, therefore cleans an interior 55 of the pipe 50 as the device 1 moves through the pipe 50.

Figure 4:
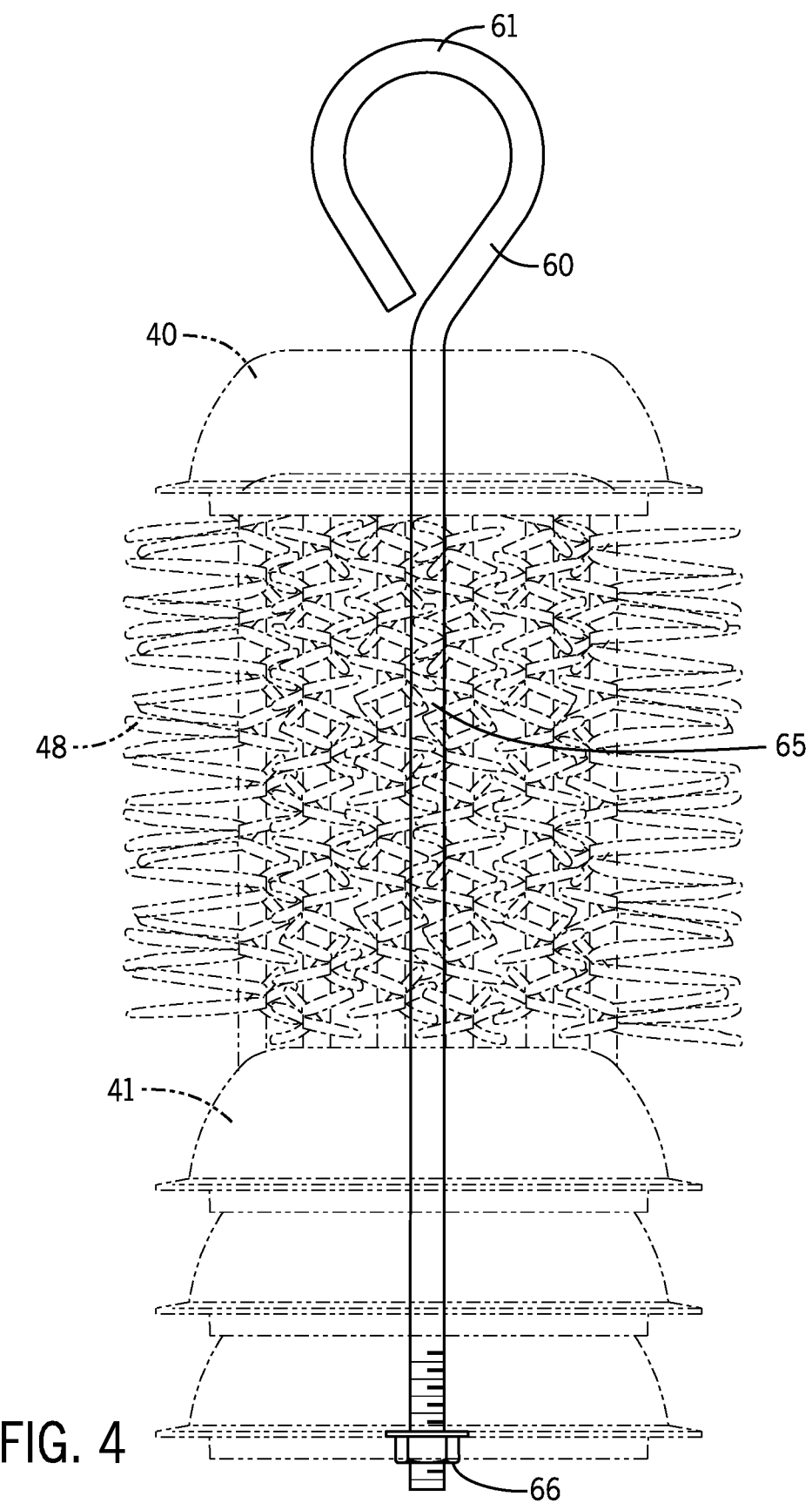
FIG. 4 illustrates a view of the internal shaft of the cleaning assembly of the device.

The cleaning assembly 30 may have a securing mechanism 60 (FIG. 4). The securing mechanism 60 may have a securing loop 61 and an internal shaft 65 which receives the interchangeable elements of the cleaning assembly 30. A nut 66 may be secured to the end of the securing mechanism 60 once the user selects which, and how many, of the interchangeable units to use in the cleaning assembly 30. The securing loop 61 may receive the rope portion 20 during use.

The interchangeable elements of the cleaning assembly 30 include at least a leading washer 40 and at least a terminal washer 41 (the figures illustrate three terminal washers being used). It should be understood that the washer may also be a flange, rubber flange, wiper, etc.). Preferably, the washers 40, 41 are made of a durable rubber or plastic material so that they are slightly elastic, yet sturdy. Each of the washer units 40, 41 has a first end 42 and a second end 43 wherein the first end 42 is located closer to the securing loop 61 of the securing mechanism 60.

In the preferred embodiment, each of the washer units 40, 41 are somewhat trapezoid-shaped wherein the first end 42 has a smaller diameter than the second end 43 of each of the washer units 40, 41. An extended flexible rim 46 may be present at the second end 43 of each of the washer units 40, 41. The extended flexible rim 46 may help even further clear debris, material, concrete, etc located in the interior 55 of the pipe 50 when the cleaning device 1 is used.

Preferably, a user selects one leading washer 40 and at least two terminal washers 41. The figures illustrate three terminal washers 41 used on the cleaning assembly 30; however, a greater or fewer number of terminal washers 41 may be used depending on the required need for the product.

In an embodiment, the cleaning assembly 30 may have a bristle unit 48. The bristle unit 48 is located between the leading washer 40 and at least one terminal washer 41. The bristle unit 48 has bristles which act to scrub the interior 55 of the pipe 50 so as to scrub and therefore clean the pipe 50. Alternative bristle units 48 may be used on the front or back of the cleaning assembly 30 having various lengths 49 depending on the pipe 50 to be cleaned. The bristles of the bristle unit 48 extend out farther than the extended flexible rim 46 so that the pipe 50 may be properly cleaned.

Figure 3:
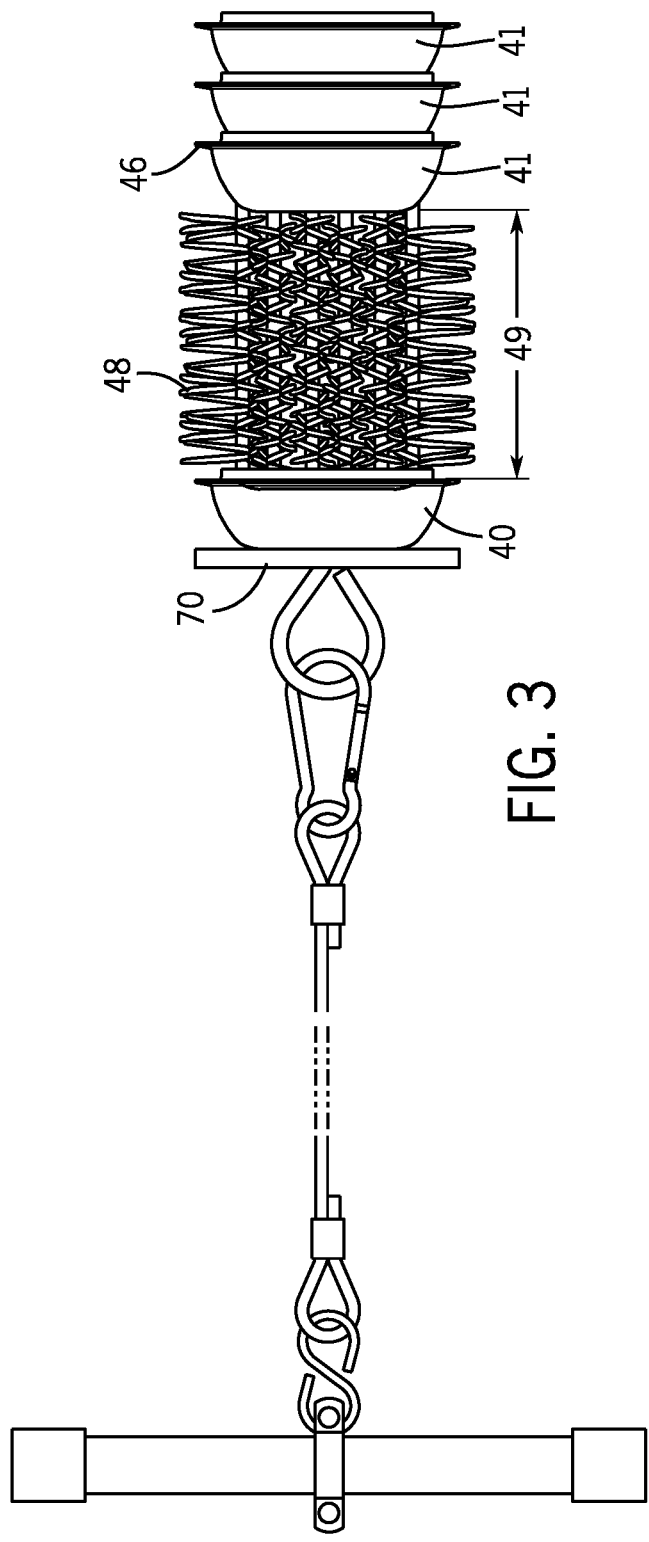
FIG. 3 illustrates a detailed view of the pipe and hose cleaning tool in an embodiment wherein an optional disc is used in connection with the tool.

In an embodiment, an optional disc 70 (FIG. 3) may be used. The disc 70 is preferably made of flexible plastic or rubber. The disc 70 allows for increased contact with the interior 55 walls of the pipe 50 so that the pipe 50 is properly cleaned.

During use, a user first selects the proper combination of washer units 40, 41 and proper length bristle unit 48 as well as deciding on if to incorporate the optional disc 70. Once the elements of the cleaning assembly 30 are determined and added onto the shaft 65 of the securing unit 60, the securing nut 66 is then added to the shaft 65 so that the elements of the cleaning assembly 30 are secured.

Once the elements of the cleaning assembly 30 are selected and secured to the securing mechanism 60 the user then attaches the securing mechanism 60 of the cleaning assembly 30 to the second end 22 of the rope unit 20. Because of the slightly rigid nature of the rope unit 20, the rope unit 20 may be manually pushed through the pipe 50 until the end of the rope unit 20 exits the pipe 50. Next, the user attaches the first end 21 of the rope unit 20 to the handle unit 10. The user then slowly pulls the handle unit 10 away from the pipe 50 so that the cleaning assembly 30 slowly contacts the interior 55 walls of the pipe 50 and cleans the pipe 50 as it passes completely through the pipe 50. The device 1 is especially suitable for cleaning pipes used to transport concrete. For increased effectiveness, the process may be repeated. Once the pipe 50 is cleaned, the device 1 may be disassembled and cleaned. Because the pieces are interchangeable, a user can replace the bristle unit 48 (and/or flanges) when the bristle unit 48 (and/or flanges) become worn.

Although embodiments of the invention are shown and described therein, it should be understood that various changes and modifications to the presently preferred embodiments will be apparent to those skilled in the art. Such changes and modifications may be made without departing from the spirit and scope of the invention and without diminishing its attendant advantages.

I claim:

1. A pipe or hose cleaning tool comprising:
   a handle portion;
   a rope portion wherein a coated material is added to the rope portion to make the rope portion stiffer;
   a cleaning assembly wherein the rope portion has a first end and a second end wherein the first end of the rope portion is secured to the handle portion and wherein the second end of the rope portion is secured to the cleaning assembly;
   a first end of the cleaning assembly and a second end of the cleaning assembly;
   a first washer unit located at the first end of the cleaning assembly wherein the first washer unit is removable from the cleaning assembly;
   a flexible flange located on a perimeter of the first washer unit;
   wherein the flexible flange of the first washer unit contacts an interior of the pipe or hose and cleans the interior of the pipe or hose; and
   a bristle unit within the cleaning assembly wherein the bristle unit cleans the interior of the pipe or hose with the flexible flange of the first washer unit.

2. The pipe or hose cleaning tool of claim 1 further comprising:
   the bristle unit is removable from the cleaning assembly.

3. The pipe or hose cleaning tool of claim 1 further comprising:
   a second washer unit located at the second end of the cleaning assembly wherein the second washer unit is removable from the cleaning assembly.

4. The pipe or hose cleaning tool of claim 3 wherein the first washer unit and the second washer unit have a diameter.

5. The pipe or hose cleaning tool of claim 4 wherein the diameter of the first washer unit and the diameter of the second washer unit are less than a diameter of the bristle unit of the cleaning assembly.

6. The pipe or hose cleaning tool of claim 3 wherein the second washer unit is made of rubber.

7. The pipe or hose cleaning tool of claim 3 further comprising:
   a third washer unit of the cleaning assembly wherein the second washer unit is located between the third washer unit and the bristle unit.

8. The pipe or hose cleaning tool of claim 3 wherein the first washer unit and second washer unit are trapezoid in shape having a smaller first end than second end.

9. The pipe or hose cleaning tool of claim 1 wherein the first washer unit is made of rubber.

10. The pipe or hose cleaning tool of claim 1 wherein the rope portion is removably secured to the handle portion and the cleaning assembly.

11. The pipe or hose cleaning tool of claim 1 further comprising:
   a securing mechanism located on the handle portion wherein the securing mechanism temporarily secures the rope portion to the handle portion.

12. The pipe or hose cleaning tool of claim 1 further comprising:
   a protective cap located at a first end and a second end of the handle portion.

13. The pipe or hose cleaning tool of claim 1 further comprising:
   an internal shaft located within the cleaning assembly wherein the internal shaft secures a first washer, a second washer and a bristle unit of the cleaning assembly.

14. The pipe or hose cleaning tool of claim 1 wherein the rope portion is flexible.

* * * * *